(12) United States Patent
Stafford et al.

(10) Patent No.: US 11,635,802 B2
(45) Date of Patent: Apr. 25, 2023

(54) COMBINED LIGHT INTENSITY BASED CMOS AND EVENT DETECTION SENSOR FOR HIGH SPEED PREDICTIVE TRACKING AND LATENCY COMPENSATION IN VIRTUAL AND AUGMENTED REALITY HMD SYSTEMS

(71) Applicant: Sony Interactive Entertainment Inc., Tokyo (JP)

(72) Inventors: Jeffrey R. Stafford, San Mateo, CA (US); Xiaoyong Ye, San Mateo, CA (US); Yutaka Yokokawa, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 25 days.

(21) Appl. No.: 16/741,285

(22) Filed: Jan. 13, 2020

(65) Prior Publication Data

US 2021/0216133 A1    Jul. 15, 2021

(51) Int. Cl.
  *G02B 27/01*  (2006.01)
  *G06F 3/01*  (2006.01)
  *H04N 23/11*  (2023.01)

(52) U.S. Cl.
  CPC .......... *G06F 3/011* (2013.01); *G02B 27/0179* (2013.01); *H04N 23/11* (2023.01); *G02B 2027/0187* (2013.01)

(58) Field of Classification Search
  CPC .......... G06F 3/013; G06F 3/011; G06F 3/012; G06F 3/017; G06F 3/0304; G06F 3/0346; G06F 3/147; G06F 3/014; G06F 3/04815; G06T 19/006; G06T 7/20; G06T 7/66; G06T 7/70; H04N 13/383
  See application file for complete search history.

(56) References Cited

U.S. PATENT DOCUMENTS

| 5,949,064 | A  | * | 9/1999  | Chow ................. H04B 10/032 |
|           |    |   |         |                       250/214 LS |
| 9,595,083 | B1 |   | 3/2017  | Smith et al. |
| 9,659,403 | B1 | * | 5/2017  | Horowitz ................. G06T 7/70 |
| 9,767,613 | B1 | * | 9/2017  | Bedikian ............... G06F 1/1684 |
| 10,466,779 | B1 | * | 11/2019 | Liu ....................... G02B 27/017 |
| 10,782,779 | B1 | * | 9/2020  | Eubank .................. G06F 3/016 |
| 10,845,601 | B1 | * | 11/2020 | Meier .................... G06F 3/0325 |
| 11,170,521 | B1 | * | 11/2021 | Ben Himane ........... G06T 19/20 |
| 11,190,753 | B1 | * | 11/2021 | Meier ................... G06T 19/006 |

(Continued)

OTHER PUBLICATIONS

International Search Report and Written Opinion dated Apr. 9, 2021, from the counterpart PCT application PCT/US21/12693.

*Primary Examiner* — Daniel Chang
(74) *Attorney, Agent, or Firm* — John L. Rogitz

(57) ABSTRACT

To facilitate control of an AR HMD, a camera unit in a camera sensor system generates RGB/IR images and the system also extrapolates images for times in the future based on light intensity change signals from an event detection sensor (EDS) for HMD pose tracking, hand tracking, and eye tracking. The times in the future are provided by an HMD application which defines the future times, and the RGB/IR images and extrapolated images are sent back to the application. In this way, the camera sensor system enables improved performance tracking (equivalent to using very high-speed camera) at lower bandwidth and power consumption.

20 Claims, 4 Drawing Sheets

Camera Logic

(56) References Cited

U.S. PATENT DOCUMENTS

| | | | |
|---|---|---|---|
| 11,367,416 B1* | 6/2022 | Richter | G06T 11/60 |
| 11,503,202 B1* | 11/2022 | Ollila | G06V 20/20 |
| 2002/0097322 A1* | 7/2002 | Monroe | G08B 13/19667 |
| | | | 348/E7.086 |
| 2004/0081342 A1* | 4/2004 | Sato | G06T 7/0012 |
| | | | 382/128 |
| 2005/0264527 A1* | 12/2005 | Lin | G06F 3/011 |
| | | | 345/156 |
| 2011/0177841 A1* | 7/2011 | Attwood | G06T 7/254 |
| | | | 455/556.1 |
| 2012/0045115 A1* | 2/2012 | Dong | G01N 21/95607 |
| | | | 382/149 |
| 2013/0038225 A1* | 2/2013 | Brian R. | H05B 47/11 |
| | | | 315/159 |
| 2013/0083173 A1* | 4/2013 | Geisner | G02B 27/017 |
| | | | 348/51 |
| 2013/0113973 A1* | 5/2013 | Miao | G02B 27/017 |
| | | | 348/E5.022 |
| 2013/0248691 A1* | 9/2013 | Mirov | G01J 1/32 |
| | | | 250/214 AL |
| 2014/0010305 A1 | 1/2014 | Mironovich et al. | |
| 2014/0285818 A1* | 9/2014 | Holz | G01S 17/42 |
| | | | 356/614 |
| 2014/0368688 A1* | 12/2014 | John Archibald | G06K 9/6218 |
| | | | 348/222.1 |
| 2015/0084840 A1* | 3/2015 | Kim | G02B 27/017 |
| | | | 345/8 |
| 2015/0094142 A1* | 4/2015 | Stafford | A63F 13/212 |
| | | | 463/31 |
| 2015/0153835 A1* | 6/2015 | Perez | G06V 40/28 |
| | | | 345/156 |
| 2015/0234455 A1* | 8/2015 | LaValle | G06F 3/012 |
| | | | 345/8 |
| 2015/0261291 A1* | 9/2015 | Mikhailov | G02B 27/0093 |
| | | | 345/156 |
| 2015/0286867 A1* | 10/2015 | Malesa | G06T 7/246 |
| | | | 382/103 |
| 2015/0294505 A1* | 10/2015 | Atsmon | G06T 19/006 |
| | | | 345/633 |
| 2016/0026253 A1 | 1/2016 | Bradski et al. | |
| 2016/0260251 A1* | 9/2016 | Stafford | G02B 27/0101 |
| 2016/0357261 A1* | 12/2016 | Bristol | G06F 1/1686 |
| 2017/0045941 A1* | 2/2017 | Tokubo | A63F 13/53 |
| 2017/0075416 A1* | 3/2017 | Armstrong | G06F 3/1454 |
| 2017/0084074 A1* | 3/2017 | Hwang | G09G 3/003 |
| 2017/0213388 A1 | 7/2017 | Margolis et al. | |
| 2017/0334066 A1 | 11/2017 | Levine et al. | |
| 2018/0137389 A1 | 5/2018 | Mathieu et al. | |
| 2018/0143429 A1* | 5/2018 | Gibbs | G06V 40/16 |
| 2018/0302562 A1* | 10/2018 | Newcombe | H04N 25/50 |
| 2019/0369718 A1* | 12/2019 | Wei | G06F 3/013 |
| 2020/0033852 A1* | 1/2020 | Park | G05D 1/0038 |
| 2020/0265590 A1* | 8/2020 | Daniilidis | G06T 7/269 |
| 2020/0348755 A1* | 11/2020 | Gebauer | G06F 18/214 |
| 2020/0389582 A1* | 12/2020 | Herman | H04N 23/71 |

\* cited by examiner

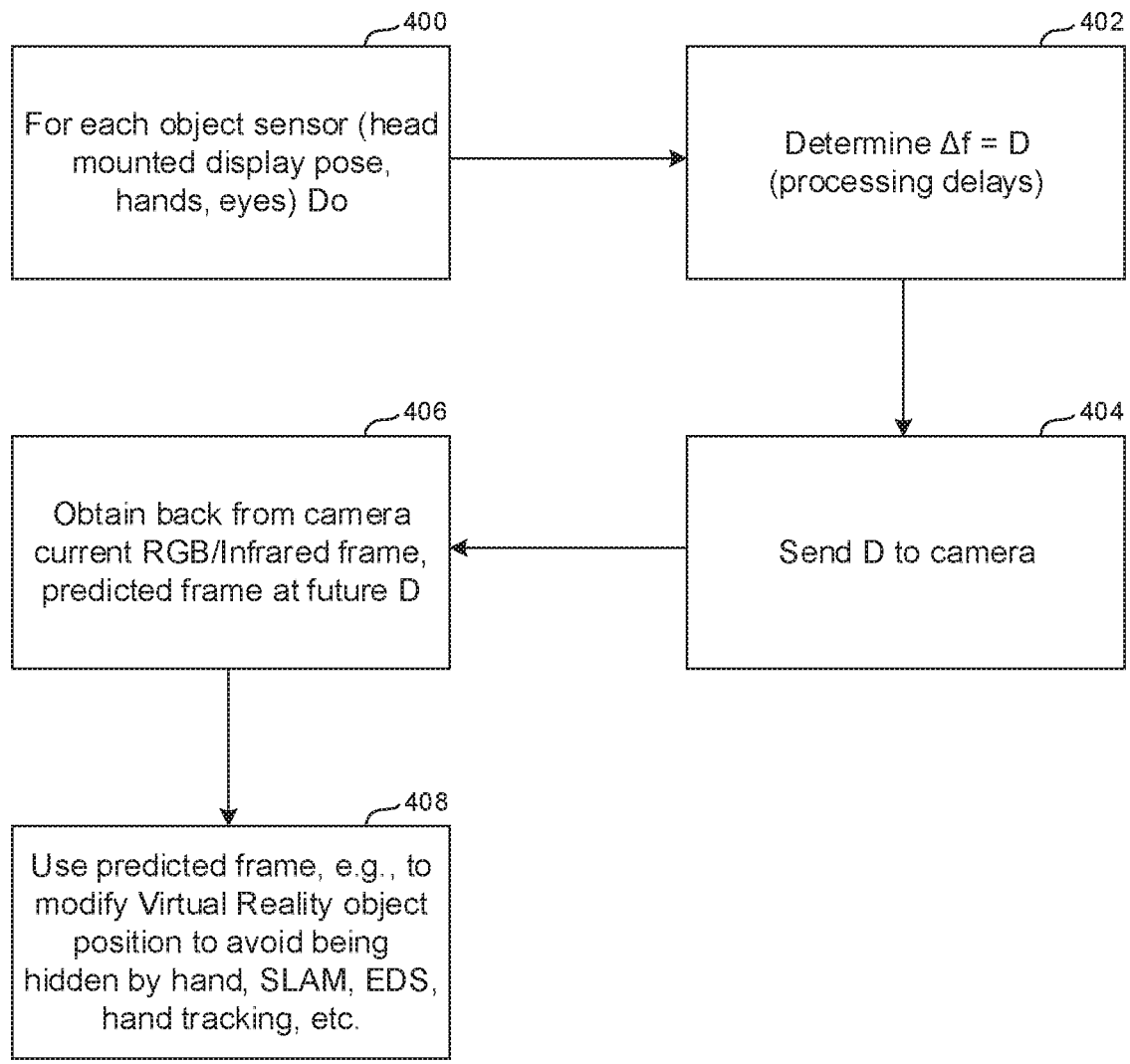
FIG. 4  Application Logic

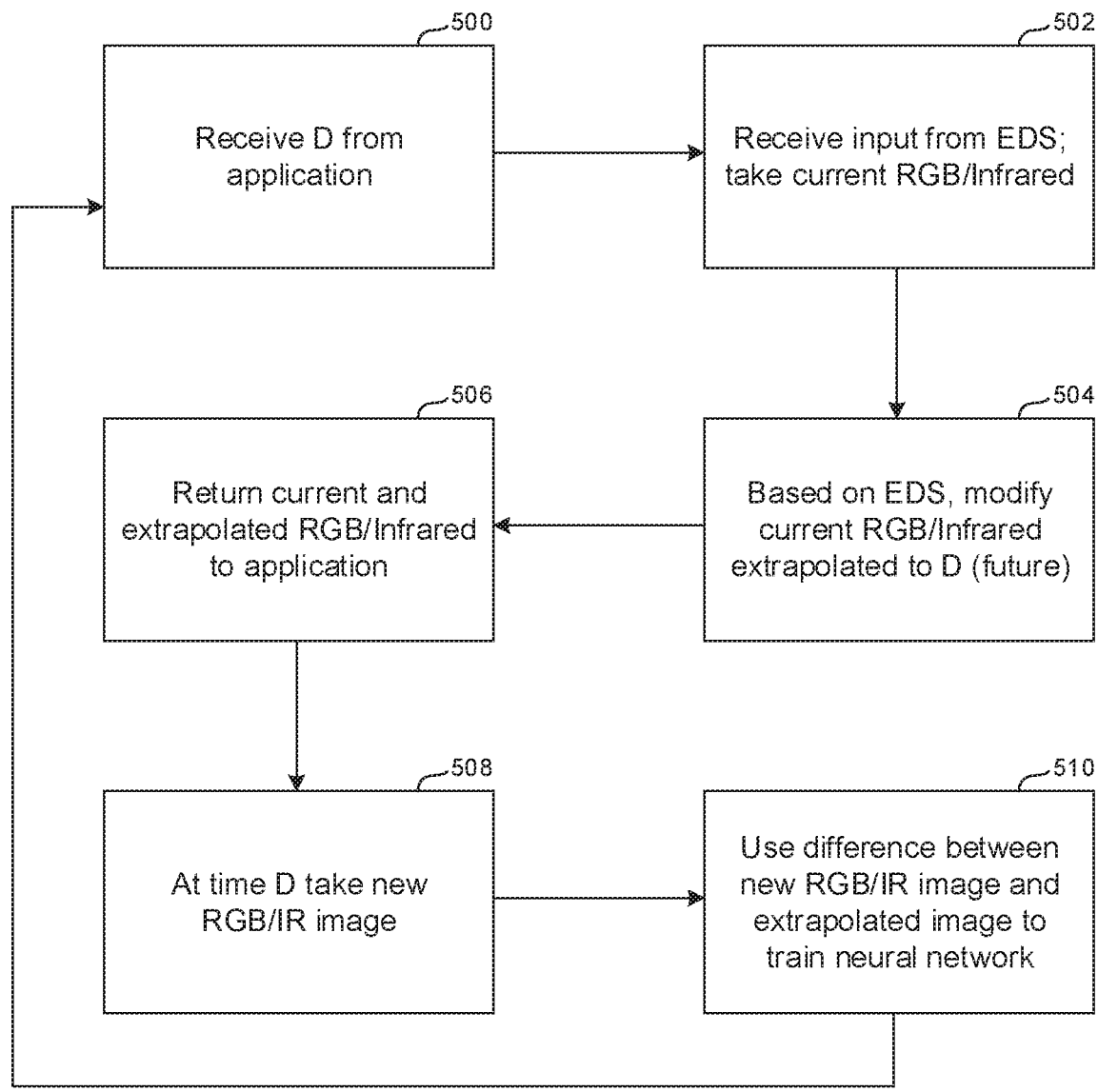
FIG. 5 Camera Logic

COMBINED LIGHT INTENSITY BASED CMOS AND EVENT DETECTION SENSOR FOR HIGH SPEED PREDICTIVE TRACKING AND LATENCY COMPENSATION IN VIRTUAL AND AUGMENTED REALITY HMD SYSTEMS

FIELD

The application relates generally to technically inventive, non-routine solutions that are necessarily rooted in computer technology and that produce concrete technical improvements.

BACKGROUND

Augmented reality (AR) head mounted displays (HMD) present images on a transparent or translucent display such that a wearer of the HMD can see both the real world through the display and the images on the display. As understood herein, to properly present virtual reality (VR) images on the HMD and for other reasons, current AR HMD systems must track the pose of the HMD, the eyes of the wearer of the HMD, and the hands of the wearer. To do this HMDs use a combination of red-green-blue (RGB) and infrared (IR) camera sensors to perform tracking of the pose of the HMD in six degrees of freedom (6DOF) using simultaneous location and mapping (SLAM) processing of scene images, using the HMD user's hand recognition and 6DOF poses by processing images of the HMD user's hands using hand tracking computer vision techniques, and using the HMD user's eye position and gaze using gaze tracking methods.

The technical challenge posed by this is that for better operation, high speed cameras may be required to reduce latency and improve tracking performance, requiring increased camera data framerates, yet such higher framerates requires higher bandwidth and processing and, thus, a relatively large consumption of power and generation of heat on the HMD.

SUMMARY

To address the challenges noted herein, a camera sensor system is provided that includes not only sensor cells with both light intensity photodiodes under color and infrared filters to capture RGB and IR images, but also an event detection sensor (EDS) sensing cells which detect motion by virtue of EDS principles. EDS uses the change of light intensity as sensed by one or more camera pixels as an indication of motion.

The camera sensor system may be configured to capture RGB/IR frames at an intermediate speed, e.g., two hundred frames per second (200 FPS), and at a relatively higher rate, e.g., more than two thousand frames per second (2000 FPS).

A smart Image Signal Processor (ISP) uses an algorithmic process to take the intermediate speed RGB/IR images and create a predicted image based on the motion determined from a collection of pixel motion events taken from the EDS cells. This ISP process may employ an algorithm to extrapolate optical motion flow or it may use a machine learned algorithm as embodied in one or more neural networks. Unlike existing camera sensors, the combined RGB/IR/EDS sensor system accepts as an input a digital time value D (e.g., in microseconds) which is used to request a future predicted camera image frame. The camera sensor system in response provides two camera image frame outputs, namely, the most current RGB/IR camera frame with current timestamp and the requested predicted RGB/IR camera frame with a timestamp equal to the current timestamp plus time value D.

The camera sensor system can function in a request mode (only sending image data on request), rather than a polling mode (sending image data constantly). Owing to the use of EDS, the camera system can provide predicted image frames with relatively large dynamic range allowing for capturing within low light or high backlit scenes. In any case the camera sensor system enables improved performance tracking (equivalent to using very high-speed camera) at lower bandwidth and power consumption.

In an example application, an AR application running on an AR HMD calculates a prediction time of when a user would see a new virtual image in the AR HMD's display. This prediction time is based on the time it takes all the HMD application processing (tracking, rendering, etc.) to complete for a given image frame, as well the time to transfer the image frame to a display and emit the light to the user's eyes. This total prediction time can be used as the input to the cameras sensor systems including the HMD 6DOF pose SLAM RGB/IR system, the hand tracking RGB/IR sensors, and the eye tracking RGB/IR sensors to derive future predicted camera images of the scene from the head view, of the scene with the hands present and the images of the user's eyes.

In addition to improving tracking, an RGB/IR+EDS camera with future image frame prediction can provide ultra-low latency real world images for a video-see through Augmented Reality System.

Accordingly, a system includes at least one augmented reality (AR) head-mounted display (HMD) that in turn includes at least one camera unit configured to generate red-green-blue (RGB) images. The system includes at least one image signal processor (ISP) and at least one event detection sensor (EDS) configured to output signals representing changes in illumination intensity to the ISP to enable the ISP to control the camera unit to generate a first RGB image at a current time=t and to extrapolate, from the RGB image, a predicted image for a future time=t+D.

In examples, the camera unit may be configured to generate infrared (IR) images.

In non-limiting embodiments, the camera unit, ISP, and EDS may be disposed on a single chip. Processing undertaken by these components may be implemented by a digital signal processor (DSP).

In example implementations, the ISP is configured to receive time value D from at least one application associated with the HMD and to return the first image and the predicted image to the application.

In some embodiments the ISP may be configured with instructions executable by the ISP to generate a second RGB image at time t+D. In such embodiments the ISP can be configured with instructions executable by the ISP to execute at least one neural network (NN) to generate the predicted image and to feed back the second image to the NN to train the NN. In specific embodiments a difference between the first (unpredicted) image and an earlier second (predicted) image is fed back to the NN based at least in part on a timestamp associated with the first image that matches a timestamp associated with the second image.

Note that the second RGB image at time t+D can be retrieved from a history buffer, where it was previously stored earlier in time. Also, the EDS data can be retrieved from a history buffer, where it was previously stored earlier in time and be used to recreate the entire second RGB image.

In another aspect, a system includes at least one camera unit configured to generate red-green-blue (RGB) images and/or infrared (IR) images, at least one image signal processor (ISP), and at least one event detection sensor (EDS) configured to output signals to enable the ISP to control the camera unit to generate a first RGB and/or IR image at a current time=t and to extrapolate, from the RGB and/or IR image, a predicted image for a future time=t+D.

In another aspect, a method includes receiving a time value D, generating a first image at a current time, and receiving signals representing changes in light intensity. Using the signals representing changes in light intensity, the method includes generating a predicted image for a future time that equals the current time plus time value D.

The details of the present application, both as to its structure and operation, can best be understood in reference to the accompanying drawings, in which like reference numerals refer to like parts, and in which:

BRIEF DESCRIPTION OF THE DRAWINGS

FIG. 4 is a flow chart of example logic of the HMD application; and

FIG. 5 is a flow chart of example logic of the camera sensor system.

DETAILED DESCRIPTION

Figure 1:
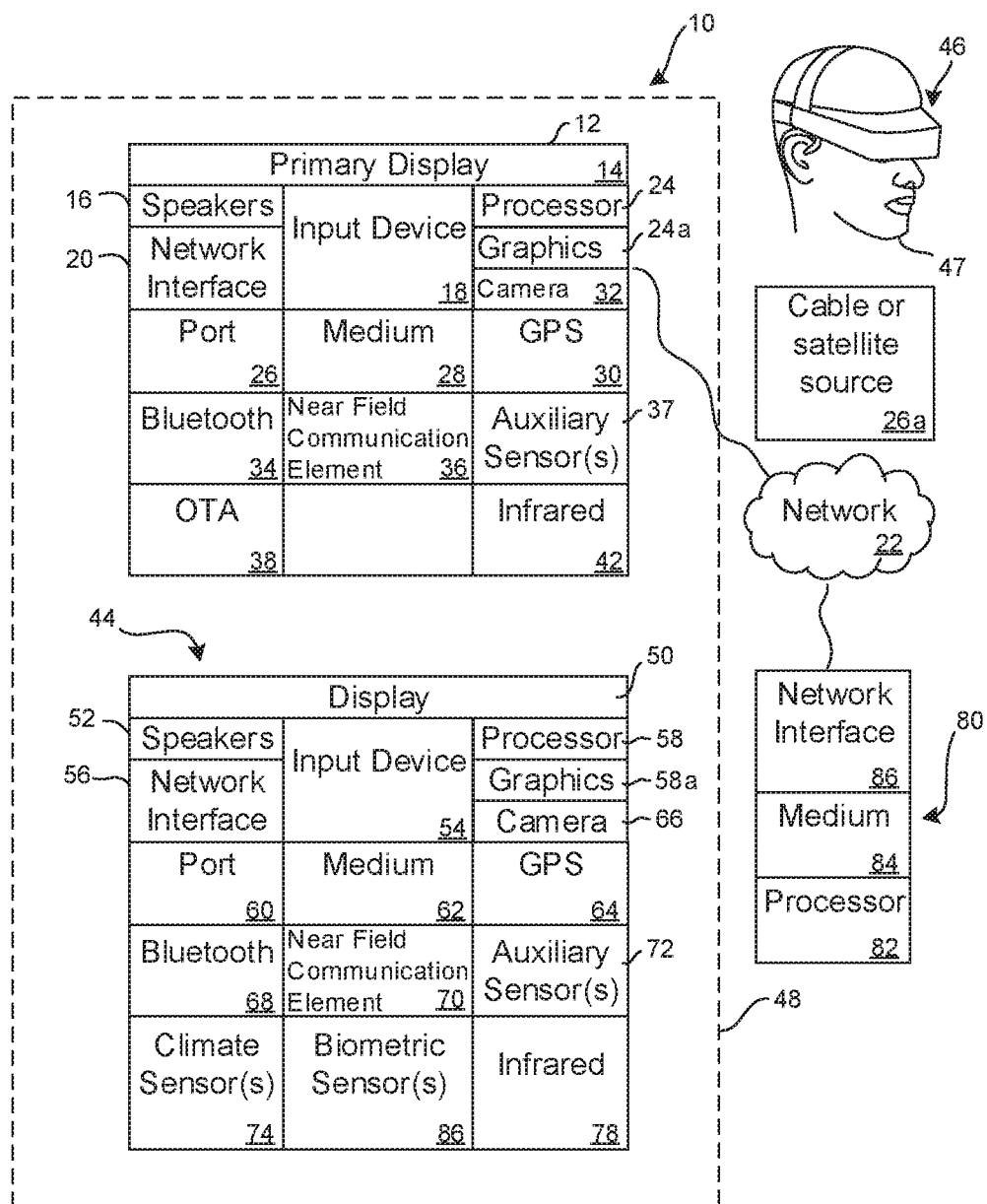
FIG. 1 is a block diagram of an example system including an example in accordance with present principles.

This disclosure relates generally to computer ecosystems including aspects of consumer electronics (CE) device networks such as but not limited to computer simulation networks such as computer game networks as well as standalone computer simulation systems. A system herein may include server and client components, connected over a network such that data may be exchanged between the client and server components. The client components may include one or more computing devices including game consoles such as Sony PlayStation® or a game console made by Microsoft or Nintendo or other manufacturers of virtual reality (VR) headsets, augmented reality (AR) headsets, portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple Computer or Google. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may include one or more processors executing instructions that configure the servers to receive and transmit data over a network such as the Internet. Or, a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

As used herein, instructions refer to computer-implemented steps for processing information in the system. Instructions can be implemented in software, firmware or hardware and include any type of programmed step undertaken by components of the system.

A processor may be single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to Java, C # or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires. Such connections may include wireless communication connections including infrared and radio.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to an Internet-enabled TV with a TV tuner (equivalently, set top box controlling a TV). However, the AVD 12 alternatively may be an appliance or household item, e.g. computerized Internet enabled refrigerator, washer, or dryer. The AVD 12 alternatively may also be a computerized Internet enabled ("smart") telephone, a tablet computer, a notebook computer, a wearable computerized device such as e.g. computerized Internet-enabled watch, a computerized Internet-enabled bracelet, other computerized Internet-enabled devices, a computerized Internet-enabled music player, computerized Internet-enabled head phones, a computerized Internet-enabled implantable device such as an implantable skin device, etc. Regardless, it is to be understood that the AVD 12 is configured to undertake present principles (e.g. communicate with other CE devices to undertake present principles, execute the logic described herein, and perform any other functions and/or operations described herein).

Accordingly, to undertake such principles the AVD 12 can be established by some or all of the components shown in FIG. 1. For example, the AVD 12 can include one or more displays 14 that may be implemented by a high definition or ultra-high definition "4K" or higher flat screen and that may be touch-enabled for receiving user input signals via touches on the display. The AVD 12 may include one or more speakers 16 for outputting audio in accordance with present principles, and at least one additional input device 18 such as e.g. an audio receiver/microphone for e.g. entering audible commands to the AVD 12 to control the AVD 12. The example AVD 12 may also include one or more network interfaces 20 for communication over at least one network 22 such as the Internet, an WAN, an LAN, etc. under control of one or more processors 24 including. A graphics processor 24A may also be included. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as e.g. controlling the display 14 to present images thereon and receiving input therefrom. Furthermore, note the network interface 20 may be, e.g., a wired or wireless modem or router, or other appropriate interface such as, e.g., a wireless telephony transceiver, or Wi-Fi transceiver as mentioned above, etc.

In addition to the foregoing, the AVD 12 may also include one or more input ports 26 such as, e.g., a high definition multimedia interface (HDMI) port or a USB port to physically connect (e.g. using a wired connection) to another CE device and/or a headphone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be, e.g., a separate or integrated set top box, or a satellite receiver. Or, the source 26a may be a game console or disk player containing content that might be regarded by a user as a favorite for channel assignment purposes described further below. The source 26a when implemented as a game console may include some or all of the components described below in relation to the CE device 44.

The AVD 12 may further include one or more computer memories 28 such as disk-based or solid state storage that are not transitory signals, in some cases embodied in the chassis of the AVD as standalone devices or as a personal video recording device (PVR) or video disk player either internal or external to the chassis of the AVD for playing back AV programs or as removable memory media. Also in some embodiments, the AVD 12 can include a position or location receiver such as but not limited to a cellphone receiver, GPS receiver and/or altimeter 30 that is configured to e.g. receive geographic position information from at least one satellite or cellphone tower and provide the information to the processor 24 and/or determine an altitude at which the AVD 12 is disposed in conjunction with the processor 24. However, it is to be understood that another suitable position receiver other than a cellphone receiver, GPS receiver and/or altimeter may be used in accordance with present principles to e.g. determine the location of the AVD 12 in e.g. all three dimensions.

Continuing the description of the AVD 12, in some embodiments the AVD 12 may include one or more cameras 32 that may be, e.g., a thermal imaging camera, a digital camera such as a webcam, and/or a camera integrated into the AVD 12 and controllable by the processor 24 to gather pictures/images and/or video in accordance with present principles. Also included on the AVD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 37 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command, etc.) providing input to the processor 24. The AVD 12 may include an over-the-air TV broadcast port 38 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12.

Still referring to FIG. 1, in addition to the AVD 12, the system 10 may include one or more other CE device types. In one example, a first CE device 44 may be used to send computer game audio and video to the AVD 12 via commands sent directly to the AVD 12 and/or through the below-described server while a second CE device 46 may include similar components as the first CE device 44. In the example shown, the second CE device 46 may be configured as an AR headset worn by a player 47 as shown. In the example shown, only two CE devices 44, 46 are shown, it being understood that fewer or greater devices may be used.

In the example shown, to illustrate present principles all three devices 12, 44, 46 are assumed to be members of an entertainment network in, e.g., a home, or at least to be present in proximity to each other in a location such as a house. However, present principles are not limited to a particular location, illustrated by dashed lines 48, unless explicitly claimed otherwise.

The example non-limiting first CE device 44 may be established by any one of the above-mentioned devices, for example, a portable wireless laptop computer or notebook computer or game controller, and accordingly may have one or more of the components described below. The first CE device 44 may be a remote control (RC) for, e.g., issuing AV play and pause commands to the AVD 12, or it may be a more sophisticated device such as a tablet computer, a game controller communicating via wired or wireless link with the AVD 12 and/or a game console, a personal computer, a wireless telephone, etc.

Accordingly, the first CE device 44 may include one or more displays 50 that may be touch-enabled for receiving user input signals via touches on the display. The first CE device 44 may include one or more speakers 52 for outputting audio in accordance with present principles, and at least one additional input device 54 such as e.g. an audio receiver/microphone for e.g. entering audible commands to the first CE device 44 to control the device 44. The example first CE device 44 may also include one or more network interfaces 56 for communication over the network 22 under control of one or more CE device processors 58. A graphics processor 58A may also be included. Thus, the interface 56 may be, without limitation, a Wi-Fi transceiver, which is an example of a wireless computer network interface, including mesh network interfaces. It is to be understood that the processor 58 controls the first CE device 44 to undertake present principles, including the other elements of the first CE device 44 described herein such as e.g. controlling the display 50 to present images thereon and receiving input therefrom. Furthermore, note the network interface 56 may be, e.g., a wired or wireless modem or router, or other appropriate interface such as, e.g., a wireless telephony transceiver, or Wi-Fi transceiver as mentioned above, etc.

In addition to the foregoing, the first CE device 44 may also include one or more input ports 60 such as, e.g., a HDMI port or a USB port to physically connect (e.g. using a wired connection) to another CE device and/or a headphone port to connect headphones to the first CE device 44 for presentation of audio from the first CE device 44 to a user through the headphones. The first CE device 44 may further include one or more tangible computer readable storage medium 62 such as disk-based or solid-state storage. Also in some embodiments, the first CE device 44 can include a position or location receiver such as but not limited to a cellphone and/or GPS receiver and/or altimeter 64 that is configured to e.g. receive geographic position information from at least one satellite and/or cell tower, using triangulation, and provide the information to the CE device processor 58 and/or determine an altitude at which the first CE device 44 is disposed in conjunction with the CE device processor 58. However, it is to be understood that another suitable position receiver other than a cellphone and/or GPS receiver and/or altimeter may be used in accordance with present principles to e.g. determine the location of the first CE device 44 in e.g. all three dimensions.

Continuing the description of the first CE device 44, in some embodiments the first CE device 44 may include one or more cameras 66 that may be, e.g., a thermal imaging camera, a digital camera such as a webcam, and/or a camera integrated into the first CE device 44 and controllable by the CE device processor 58 to gather pictures/images and/or video in accordance with present principles. Also included on the first CE device 44 may be a Bluetooth transceiver 68 and other Near Field Communication (NFC) element 70 for communication with other devices using Bluetooth and/or NFC technology, respectively. An example NFC element can be a radio frequency identification (RFID) element.

Further still, the first CE device 44 may include one or more auxiliary sensors 72 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the CE device processor 58. The first CE device 44 may include still other sensors such as e.g. one or more climate sensors 74 (e.g. barometers, humidity sensors, wind sensors, light sensors, temperature sensors, etc.) and/or one or more biometric sensors 76 providing input to the CE device processor 58. In addition to the foregoing, it is noted that in some embodiments the first CE device 44 may also include an infrared (IR) transmitter and/or IR receiver and/or IR transceiver 78 such as an IR data association (IRDA) device. A battery (not shown) may be provided for powering the first CE device 44. The CE device 44 may communicate with the AVD 12 through any of the above-described communication modes and related components.

The second CE device 46 may include some or all of the components shown for the CE device 44. Either one or both CE devices may be powered by one or more batteries.

Now in reference to the afore-mentioned at least one server 80, it includes at least one server processor 82, at least one tangible computer readable storage medium 84 such as disk-based or solid state storage, and at least one network interface 86 that, under control of the server processor 82, allows for communication with the other devices of FIG. 1 over the network 22, and indeed may facilitate communication between servers and client devices in accordance with present principles. Note that the network interface 86 may be, e.g., a wired or wireless modem or router, Wi-Fi transceiver, or other appropriate interface such as, e.g., a wireless telephony transceiver.

Accordingly, in some embodiments the server 80 may be an Internet server or an entire server "farm", and may include and perform "cloud" functions such that the devices of the system 10 may access a "cloud" environment via the server 80 in example embodiments for, e.g., network gaming applications. Or, the server 80 may be implemented by one or more game consoles or other computers in the same room as the other devices shown in FIG. 1 or nearby.

The methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may be embodied in a non-transitory device such as a CD ROM or Flash drive. The software code instructions may alternatively be embodied in a transitory arrangement such as a radio or optical signal, or via a download over the internet.

Figure 2:
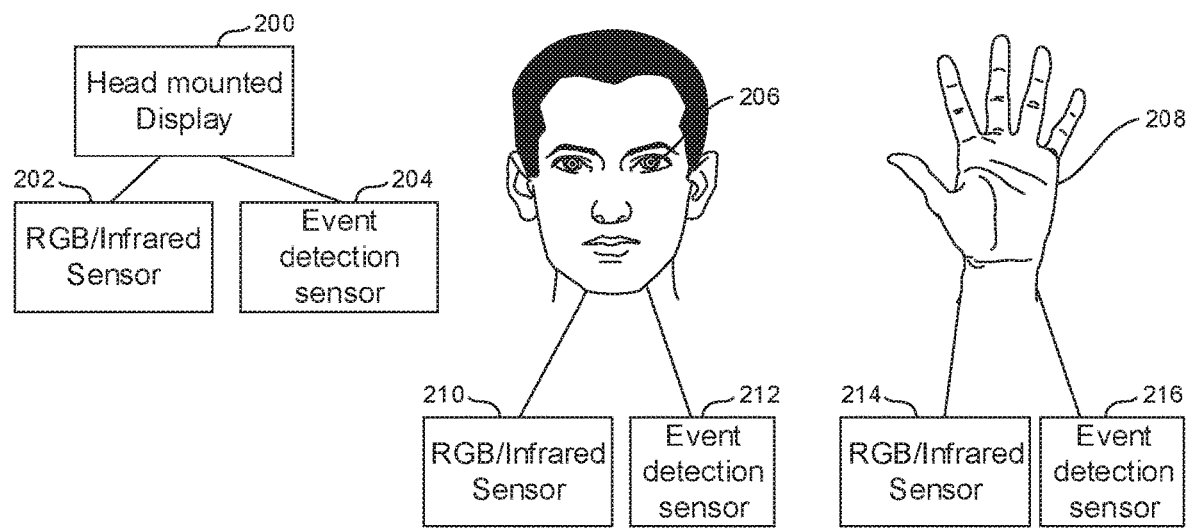
FIG. 2 is a schematic diagram of an augmented reality (AR) head-mounted device (HMD)

Now referring to FIG. 2, an augmented reality (AR) head-mounted display 200 is shown which can be implemented by an appropriately configured CE device 46 in FIG. 1 and that can be worn by a person 47 for viewing real word objects through the HMD 200 and for viewing virtual objects presented on the HMD 200. The HMD 200 can include one or more camera sensor systems (CSS) 202. The CSS 202 can generate red-green-blue (RGB) images as well as infrared (IR) images. Also, the HMD 200 may include or otherwise be associated with an event detection sensor (EDS) 204. U.S. Pat. No. 7,728,269 and the "Dynamic Vision Platform" disclosing at https://inivation.com/dvp a combined monochrome intensity and DVS sensor camera from iniVation AG of Zurich, Switzerland, both incorporated herein by reference, may be referenced in implementing these sensors.

An EDS consistent with the present disclosure provides an output that indicates a change in light intensity sensed by at least one pixel of a light sensing array. For example, if the light sensed by a pixel is decreasing, the output of the EDS may be −1; if it is increasing, the output of the EDS may be a +1. No change in light intensity below a certain threshold may be indicated by an output binary signal of 0.

FIG. 2 also shows that the eyes 206 of the person 47 and the hand or hands 208 of the person 47 wearing the HMD 200 may be tracked. This may be done using the same CSS 202 and EDS 204 as are used for the HMD 200. However, in the example shown a separate CSS 210 and EDS 212 are used to track the eyes 206 and a separate CSS 214 and EDS 216 are used to track the hands 208.

Images from the CSS and EDS in FIG. 2 may be used for tracking the hands and eyes of the person 47 wearing the HMD 200 as well as for obtaining SLAM information to derive 6DOF pose information of the HMD 200.

Figure 3:
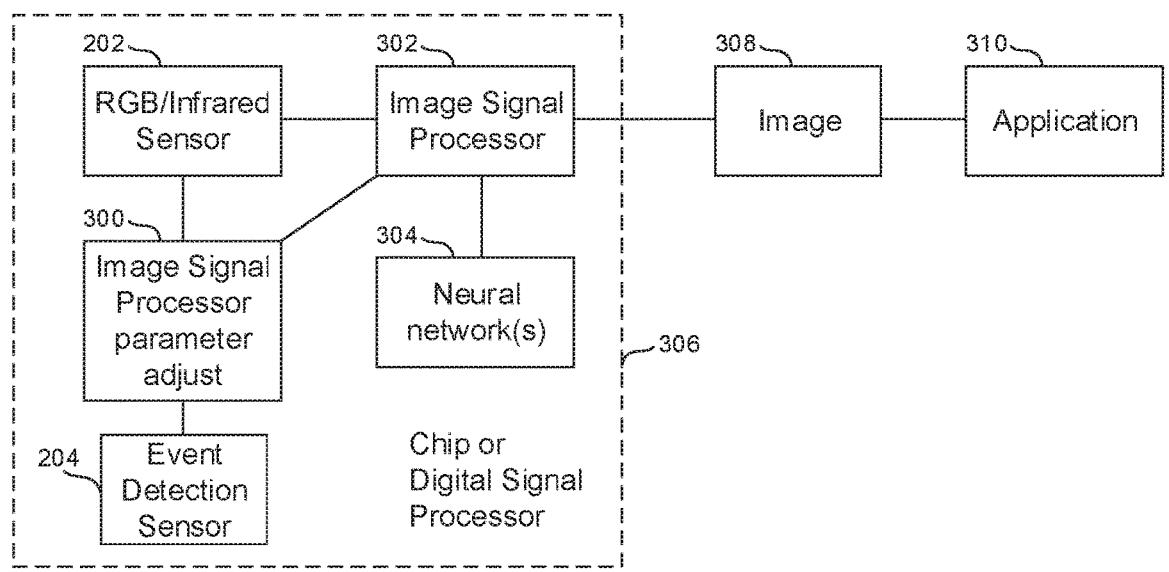
FIG. 3 is a block diagram of the camera sensor system in an example environment.

FIG. 3 illustrates an example implementation using the CSS 202 and EDS 204 of the HMD 200 as an example. In the example shown, the EDS 204 sends its signals to an image signal processor (ISP) parameter adjustment block (PAB) 300 that generates adjustment signals to pixel values of images generated by the CSS 202 to render predicted images consistent with disclosure below. The ISP PAB 300 may be controlled by an ISP 302 executing an algorithm such as one or more neural networks (NN) 304. Non-machine learning algorithms also may be executed to generate the adjustments in the PAB 300 to render predicted images.

In the example shown, the CSS 202, EDS 204, and ISP 302 are all implemented on a single chip 306 that may include local memory for storing images including EDS-generated images and CSS-generated images. The processing of the components may be executed by a single digital signal processor (DSP). In any case, the ISP 302 outputs RGB/IR from the CSS 202 and predicted images generated by data from the NN 304 as images 208 to one or more external applications 310, such as 6DOF pose applications, VR object generation algorithms, etc.

FIG. 4 illustrates logic that the application 310 in FIG. 3 may execute, while FIG. 5 illustrates logic that the CSS 202/EDS 204/ISP 302 may execute. Block 400 indicates that the logic may be executed for each of the objects sought to be tracked, i.e., to track the HMD pose or the eyes or the hands of the wearer of the HMD. At block 402 the application determines what is essentially a time differential into the future at which it desires to know a predicted image of the object sought to be tracked. This time differential, referred to herein as "D", may be many milliseconds in length, and is dependent on various latencies in the system. For example, an AR application 310 running on the AR HMD 200 can calculate a prediction time of when a user would see a new virtual image in the AR HMD's display. This prediction time is based on the time it takes all the HMD application processing (tracking, rendering, etc.) to complete for a given image frame, as well the time to transfer the image frame to a display and emit the light to the user's eyes. The application may better render the virtual image if it knew a predicted location or pose of an object sought to be tracked, e.g., the pose of HMD within a scene or the eyes or the hands of the wearer.

Moving to block 404, the time differential "D" is sent to the camera system, e.g., to the ISP 302. In response, at block 406 the application 310 receives back a current RGB/IR image generated by the CSS 202 at current time "t" along with a predicted image for the future time t+D that is based on light intensity change information from the EDS 204. Block 408 indicates that the predicted (EDS) frame and current RGB/IR frame are used, for example, to modify the location on the HMD 200 that a VR object may be presented in the event, for example, the user's hand would be co-located with the emulated real world location of the VR object. The images received at block 406 may also be used for determining the gaze direction of the eyes 206, pose of the hand 208, and pose of the HMD 200.

Now referring to FIG. 5, at block 500 the ISP 302 receives the time value "D" from the application 310 along with or constituting a request for a current time image and a predicted image at current time+D. An RGB/IR image is then taken at current time "t" by the CSS 202 and the differential light intensity values are received from the EDS 204. These values are used to modify pixel values for a future time=t+D in a copy of the RGB/IR image by the ISP parameter adjust block 300 at block 504 to generate a predicted image for time t+D. Note that in so doing, the changes in light intensity indicated on a pixel-by-pixel basis by the EDS 204 correlate to how the RGB image can be expected to change by time t+D, and that this correlation can be learned by the NN 304. The NN 304 initially may be trained on a training set of ground truth images vs. EDS values and then further trained as discussed below.

The current time t RGB/IR image and the predicted image are returned to the application 310 at block 506. Note that in generating the predicted image, a new RGB/IR image is not actually taken immediately but only a copy of the current RGB/IR image is altered, thus saving power and alleviating the need for a higher frame per second (FPS) camera speed.

From block 506 the logic moves to block 508 to take a new RGB/IR image using the CSS 202 at time D, i.e., when "D" represents a time delta, when a new current time equals the "old" current time at which an image was generated at block 502 plus D. This second RGB/IR image can serve as ground truth to further train the NN 304 at block 510, which uses differences between the second RGB/IR image generated at block 508 and the predicted image rendered at block 504, which both have essentially matching timestamps that can accompany their data structures when saved, e.g., locally in memory and then retrieved for training, to train the NN. Training may occur for every EDS-modified image generated at block 504 or for only a subset of those images to conserve processing power.

It will be appreciated that whilst present principals have been described with reference to some example embodiments, these are not intended to be limiting, and that various alternative arrangements may be used to implement the subject matter claimed herein.

What is claimed is:

1. A system comprising:
   at least one virtual reality or augmented reality (AR) head-mounted display (HMD) comprising:
   at least one camera unit configured to generate red-green-blue (RGB) images;
   at least one image signal processor (ISP); and
   at least one event detection sensor (EDS) configured to output signals, each of the signals representing a respective change in illumination intensity, the signals being provided to the ISP to enable the ISP to control the camera unit to generate a first RGB image at a current time and to extrapolate, from the RGB image and based on the signals from the EDS, a predicted image for a future time.

2. The system of claim 1, wherein the camera unit is configured to generate infrared (IR) images.

3. The system of claim 1, wherein the camera unit, ISP, and EDS are disposed on a single chip.

4. The system of claim 1, wherein processing of the camera unit, ISP, and EDS is implemented by a digital signal processor (DSP).

5. The system of claim 1, wherein the ISP is configured to receive a time value indicating the future time from at least one application associated with the HMD.

6. The system of claim 5, wherein the ISP is configured with instructions executable by the ISP to return the first image and the predicted image to the application.

7. The system of claim 1, wherein the ISP is configured with instructions executable by the ISP to generate a second RGB image at the future time.

8. The system of claim 7, wherein the ISP is configured with instructions executable by the ISP to:
   execute at least one neural network (NN) to generate the predicted image; and
   feed back to the NN a difference between the first image and an earlier second image based at least in part on a timestamp associated with the first image matching a timestamp associated with the second image.

9. A system comprising:
   at least one camera unit configured to generate red-green-blue (RGB) images and/or infrared (IR) images;
   at least one image signal processor (ISP); and
   at least one event detection sensor (EDS) configured to output signals to enable the ISP to control the camera unit to generate a first RGB and/or IR image at a current time and to extrapolate, from the RGB and/or IR image and based on the signals from the EDS, a predicted image for a future time.

10. The system of claim 9, wherein the camera unit is configured to generate RGB images.

11. The system of claim 9, wherein the camera unit, ISP, and EDS are disposed on a single chip.

12. The system of claim 9, wherein the camera unit, ISP, and EDS are implemented on a digital signal processor (DSP).

13. The system of claim 9, wherein the ISP is configured to receive D from at least one application associated with a head-mounted display (HMD).

14. The system of claim 13, wherein the ISP is configured with instructions executable by the ISP to return the first image and the predicted image to the application.

15. The system of claim 1, wherein the ISP is configured with instructions executable by the ISP to generate a second image at the future time.

16. The system of claim 15, wherein the ISP is configured with instructions executable by the ISP to execute at least one neural network (NN) to generate the predicted image and to feed back the second image to the NN to train the NN.

17. The system of claim 9, wherein the signals output by the EDS represent changes in illumination intensity.

18. A method comprising:
   receiving a time D;
   generating a first image at a current time;
   receiving signals representing changes in light intensity the signals comprising a zero indicating no change, a negative number indicating decreasing, and a positive number indicating increasing; and
   using the signals representing changes in light intensity, generating a predicted image for a future time that equals the current time plus D.

19. The method of claim 18, comprising returning the first image and the predicted image to at least on application associated with a head-mounted display (HMD).

20. The method of claim 18, comprising:
   generating the predicted image using at least one neural network (NN);
   generating a second image at a time equal to the current time at which the first image was generated plus D; and
   providing the second image to the NN to train the NN.

* * * * *